Feb. 7, 1961
C. T. HILL
2,970,887
CHLORINATION OF METAL OXIDES
Filed April 5, 1957
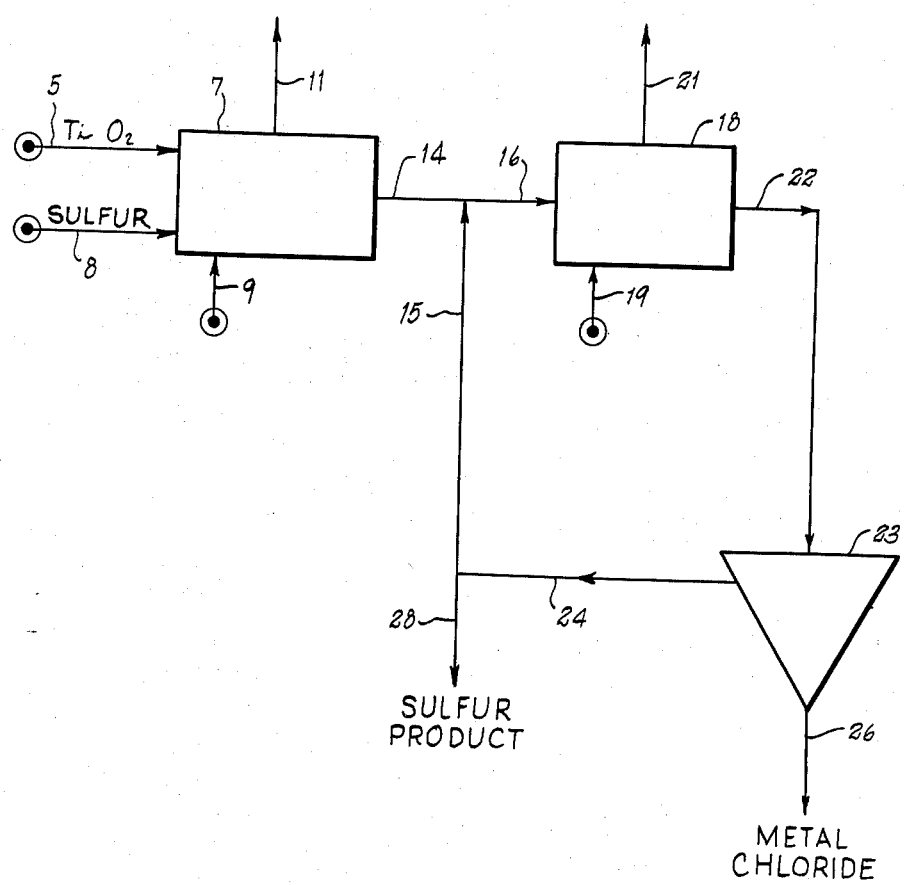
INVENTOR.
Cyril T. Hill
BY
Kenyon & Kenyon
ATTORNEYS

United States Patent Office 2,970,887
Patented Feb. 7, 1961

2,970,887
CHLORINATION OF METAL OXIDES

Cyril T. Hill, London, England, assignor to Texas Gulf Sulphur Company, New York, N.Y., a corporation of Texas Filed Apr. 5, 1957, Ser. No. 650,917

13 Claims. (Cl. 23—87)

This invention relates to a process of chlorinating metal oxides for the production of metal chlorides, and, more particularly, it pertains to a chlorination reaction which is especially adapted for continuous operation.

By one well-known technique of chlorination, the reaction takes place in vapor phase involving the reaction between solid metal oxide and vaporous chlorinating agent. This process leaves much to be desired because of relatively poor conversion and complicated product recovery. In an effort to improve this process, it appeared, at first, that effecting the reaction in liquid phase would substantially eliminate the problems of the vapor phase reaction by reason of the better contact between the solid reactant and chlorinating agent. It was found, however, that liquid phase reaction offered other problems, notably in connection with product recovery, because the product contains a mixture of unreacted chlorinating agent and metal oxide, metal chloride and by-product materials. Since any commercially feasible process would be operated on a continuous basis, it was felt that the liquid phase reaction offered insurmountable obstacles, unless some techinque could be found to overcome the same. After extensive investigation, it was found quite unexpectedly that the commercialization of the liquid phase reaction can be realized by the expedients to be discussed hereinbelow.

It is one object of this invention to provide a process for chlorinating metal oxides in liquid phase to produce commercially attractive quantities of metal chloride.

Another object is to provide a process in which the desired metal chloride is readily separated from the reaction mass as the reaction proceeds.

Still another object of this invention is to provide a process in which loss of chlorinating agent through volatilization is kept to a minimum.

A further object of this invention is to provide a process in which contamination of product is substantially reduced.

Other objects and advantages of this invention will be apparent from the following description and explanation thereof.

In the present invention, an oxide of a metal whose chloride boils in the range of between the melting point and boiling point of sulfur is chlorinated with an agent selected from chlorine, sulfur chloride and ferric chloride in the presence of liquid sulfur at a temperature falling in the range of between the melting point of sulfur and the boiling point thereof.

To overcome the many problems inherent in attempting to separate the metal chloride product from a reaction product containing by-products, chlorinating agent, etc., the metal oxide reactant for the purpose of this invention is one whose chloride is volatile under reaction conditions. Hence, as the reaction proceeds, preliminary separation of the metal chloride is effected. Specific examples of metal oxides falling within the scope of this invention are: antimony trioxide, arsenic trioxide, bismuth trioxide, ferric oxide, germanium oxide, mercuric oxide, selenium oxide, stannic oxide, vanadium dioxide, zirconium dioxide, columbium oxide, tungsten oxide, tantalum oxide, etc.

The metal oxide reactant is suspended in liquid sulfur in order to provide a reaction medium for the chlorination reaction. The quantity of sulfur is sufficient to serve as a suspension medium and as a washing agent for metal chloride which adheres to the surface of the remaining oxide particles following the reaction with the chlorinating agent. Without an adequate amount of sulfur the reaction does not proceed satisfactorily. The reactant tends to encrust with other solid material which hinders contact of the chlorinating agent with the oxide reactant. To avoid these undersirable effects, about 2.5 to 10 times by weight as much sulfur as metal oxide is used in the reaction.

The use of liquid sulfur as the suspension medium has other important advantages. As will be seen hereinbelow, sulfur is either an intermediate reactant or a product in this reaction. Additionally, sulfur forms desirable high boiling compounds with the chlorinating agents, and thus loss of agent through volatilization is reduced. The temperature at which the reaction is conducted is between about the melting and boiling points of sulfur. Therefore, it can be seen that sulfur is uniquely suited for the chlorination reaction, because it provides many advantages which cannot be achieved by other liquids.

The chlorinating agents described hereinabove either react directly with the metal oxide or form desirable compounds with sulfur, which in turn chlorinate the metal oxide. For a better understanding, titanium oxide will serve as an illustrative example of the way in which the chlorination reaction is effected by the respective chlorinating agents.

(1) Elemental chlorine as chlorinating agent:

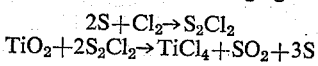

(2) Sulfur chloride as chlorinating agent:

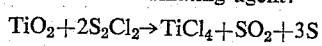

(3) Ferric chloride as chlorinating agent:

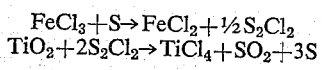

It can be seen that sulfur chloride is involved in all reactions regardless of the source of chlorinating agent. Sulfur monochloride boils at about 138° C. and, therefore, care should be taken to prevent excessive volatilization at higher reaction temperatures. In the present invention, sulfur monochloride forms higher boiling complexes with the sulfur. These high boiling complexes are desirable in keeping down volatilization losses. Another technique which is helpful in reducing volatilization loss involves conducting the process in more than one stage and charging the stoichiometric amount of metal oxide to the first stage and less than the stoichiometric quantity of chlorinating agent thereto. The unreacted metal oxide is passed to the next stage and the remaining required amount of chlorinating agent is then fed thereto. For such a continuous operation, the number of stages will depend upon the economics involved. The quantity of chlorinating agent charged to any stage of the process can vary from about 25 to 75% of the stoichiometric amount required in the process, based on the metal oxide charge. Usually, equivalent amounts are charged to each reaction zone. This quantity can, however, be less or more than indicated. As the reaction mixture flows from one stage to another, in the case where sulfur chloride is charged to the system as the chlorinating agent, the sulfur concentration increases steadily, because a net amount of sulfur is produced in the process. Therefore, if desired, any excess of sulfur can be separated from the reaction mixture between stages.

The reaction temperature can be varied by operating the process at subatmospheric or superatmospheric pressures, as well as atmospheric pressure. For this invention, the temperature may vary from 100° to about 440° C., although more usually, it will be about 150° to 400° C. Higher temperatures accelerate reaction rate and promote conversion or yields.

In order to provide a fuller understanding of this invention, results on batchwise experiments are given below.

| Example No. | Rutile[1] Charge, gm. | Titanium Content of Charge, gm. | $S_2Cl_2$ Charge, gm. | Sulfur Charge, gm. | Temperature, °C. | Time, Hr.[2] | Titanium Conversion,[3] percent | $TiCl_4$ in Product, percent |
|---|---|---|---|---|---|---|---|---|
| 1 | 60 | 34.5 | 809.8 | 400 | 315 | 13.5 | 7.5 | 4.3 |
| 2 | 100 | 57.5 | 674.8 | 400 | 350 | 5.25 | 6.3 | 2.3 |
| 3 | 100 | 57.5 | 674.8 | 400 | 400 | 5.75 | 15.0 | 5.4 |
| 4 | 100 | 57.6 | 674.8 | 400 | 400 | 5 | 17.1 | 6.1 |

[1] Rutile contains iron oxide in addition to titanium dioxide.
[2] Represents the time over which $S_2Cl_2$ was added to the reaction mixture.
[3] Conversion was calculated on the basis of titanium in the liquid product.

In another experiment, one hundred grams of zirconium dioxide were suspended in 400 grams of liquid sulfur. Sulfur monochloride was then charged slowly until three times the stoichiometric amount was added. The temperature of reaction was 350° C. 28% conversion of oxide to zirconium tetrachloride was obtained.

By reference to the accompanying drawing, a better understanding of the adaptability of my process to a continuous operation can be obtained.

In the drawing, one pound mole per hour of titanium dioxide is supplied by means of line 5 to a reactor 7. Liquid sulfur is supplied to the reactor 7 by means of line 8 at a rate which is about five times as much by weight as the titanium dioxide. Elemental chloride is fed to the reactor 7 by means of line 9 at the rate of one pound mole per hour. The quantity of chlorine being fed at this point is sufficient to react with approximately one-half of the amount of titania which is introduced to the reactor by means of line 5. It is advantageous to use an excess of titania in the reactor in order to minimize vaporization of sulfur chloride. In reactor 7 the temperature is maintained by suitable means at about 250° C. and at approximately atmospheric level. Under these conditions chlorine reacts with sulfur to produce sulfur chlorides, and due to the presence of excess sulfur, the sulfur chlorides do not boil at the existing temperature. Consequently, the titanium tetrachloride which is produced by the chlorination reaction is yielded as a vaporous product and is removed from the system by means of line 11. In the reaction between titania and sulfur chloride the oxygen which is chemically combined with titania is converted to sulfur dioxide. The sulfur dioxide by-product is yielded with the titanium tetrachloride product. In addition to these products, elemental sulfur is also produced. Since the chlorinating agent is elemental chlorine, there is a net loss of sulfur from the system in the form of sulfur dioxide. The reaction mass containing unreacted titanium dioxide is discharged from reactor 7 by means of line 14. Sulfur is combined with the reaction mass in line 14 by means of recycle line 15 at a rate equivalent to the amount of sulfur which is converted to sulfur dioxide in the first stage reactor 7. The total mass flows through line 16 and enters a second stage reactor 18. In the second stage reactor an additional pound mole per hour of elemental chlorine is fed by means of line 19. The total quantity of chlorine being charged through lines 9 and 19 corresponds to the stoichiometric quantity which is needed to react with the total titanium dioxide charge to the first stage reactor 7 via line 5. The temperature and pressure in the second stage reactor 18 are essentially the same as those maintained in the first stage reactor 7. The titanium tetrachloride and sulfur dioxide being produced in the second stage reactor 18 are withdrawn therefrom by means of line 21. The total liquid reaction product is discharged from reactor 18 by means of line 22. This product material is fed to a suitable separator 23 wherein liquid sulfur is separated by settling or other suitable means and withdrawn therefrom by means of line 24. The metal chloride product containing some sulfur is separated as a separate fraction and discharged from separator 23 by means of line 26. A portion of the liquid sulfur fraction being discharged from separator 23 is recycled to the second stage reactor 18 by means of line 15. The unreacted sulfur is yielded from a system by means of line 28.

It should be understood that although specific metal oxides were used in the foregoing illustrations, other metal oxides can also be used just so long as the metal chloride product boils in the range of between the melting point and boiling point of sulfur.

I claim:
1. A process for producing metal chlorides which comprises passing a metal oxide selected from the group consisting of antimony trioxide, titanium dioxide, arsenic trioxide, bismuth trioxide, germanium oxide, selenium oxide, stannic oxide, vanadium dioxide, zirconium dioxide, columbium oxide, tungsten oxide and tantalum oxide to a first reaction zone, passing liquid sulfur to the first reaction zone in an amount of about 2.5 to 10 times the weight of the metal oxide, passing a chlorinating agent selected from the group consisting of sulfur chloride, ferric chloride and chlorine to the first reaction zone in an amount less than the stoichiometric quantity needed to react with all of the said metal oxide, thereby chlorinating the metal oxide to produce a volatile metal chloride and sulfur dioxide, the temperature in the first reaction zone being maintained above the boiling point of the metal chloride but below the boiling point of sulfur, withdrawing volatilized metal chloride and sulfur dioxide from the first reaction zone, withdrawing the reaction mass comprising unreacted metal oxide and sulfur from the first reaction zone and passing the same to a second reaction zone, passing a chlorinating agent selected from the group consisting of sulfur chloride, chlorine and ferric chloride to the second reaction mass in an amount to react with the remainder of the metal oxide, passing liquid sulfur to the second reaction zone in an amount to maintain about 2.5 to 10 times the weight of metal oxide, thereby chlorinating the metal oxide to produce metal chloride and sulfur dioxide, maintaining a temperature above the boiling point of the metal chloride but below the boiling point of liquid sulfur in the second reaction zone, withdrawing volatilized metal chloride and sulfur dioxide from the second reaction zone, withdrawing the liquid reaction mass from the second reaction zone, separating liquid sulfur from the liquid reaction mass, and recycling a portion of the liquid sulfur to the second reaction zone as aforesaid.

2. The process of claim 1 wherein the metal oxide is titanium dioxide.

3. A process for producing metal chlorides which comprises passing a metal oxide selected from the group consisting of antimony trioxide, titanium dioxide, arsenic trioxide, bismuth trioxide, germanium oxide, selenium oxide, stannic oxide, vanadium dioxide, zirconium dioxide, columbium oxide, tungsten oxide and tantalum oxide to a reaction zone, passing a chlorinating agent selected from the group consisting of chlorine, sulfur chloride and ferric chloride to the reaction zone, passing liquid sulfur to the reaction zone in an amount to provide about 2.5 to 10 times the weight of the metal oxide, thereby chlorinating the metal oxide to produce metal chloride and sulfur dioxide, the temperature of the reaction zone being maintained above the boiling point of the metal chloride, but below the boiling point of the liquid sulfur and of the complex sulfur chloride, and separating the volatilized metal chloride from the liquid reaction mass.

4. The process of claim 3 wherein the metal oxide is titanium dioxide.

5. The process of claim 3 wherein the chlorinating agent is sulfur chloride.

6. The process of claim 3 wherein the chlorinating agent is chlorine.

7. The process for producing metal chlorides which comprises passing titanium dioxide to a reaction zone, passing chlorine to the reaction zone, passing liquid sulfur to the reaction zone in an amount to provide about 2.5 to 10 times the weight of metal oxide, thereby chlorinating the metal oxide to produce metal chloride and sulfur dioxide, the temperature of the reaction zone being maintained above the boiling point of the metal chloride but below the point at which the loss of chlorinating agent is significant, and separating the volatilized metal chloride from the liquid reaction mass.

8. A process for producing metal chlorides which comprises chlorinating an oxide of a metal selected from the group consisting of antimony trioxide, titanium dioxide, arsenic trioxide, bismuth trioxide, germanium oxide, selenium oxide, stannic oxide, vanadium dioxide, zirconium dioxide, columbium oxide, tungsten oxide and tantalum oxide and whose chlorides corresponding to said oxides boil at a temperature between the melting point and boiling point of sulfur with a chlorinating agent selected from the group consisting of chlorine, sulfur chloride and ferric chloride in the presence of liquid sulfur in an amount of about 2.5 to about 10 times the weight of metal oxide and at a temperature between the melting point and boiling point of sulfur.

9. A process for producing titanium chloride which comprises chlorinating titanium dioxide with a chlorinating agent selected from the group consisting of chlorine, sulfur chloride, and ferric chloride in the presence of liquid sulfur in an amount of about 2.5 to about 10 times the weight of titanium dioxide and at a temperature between the melting point and boiling point of sulfur.

10. A process for producing germanium chloride which comprises chlorinating germanium oxide with a chlorinating agent selected from the group consisting of chlorine, sulfur chloride and ferric chloride in the presence of liquid sulfur in an amount of from about 2.5 to about 10 times the weight of germanium oxide and at a temperature between the melting point and boiling point of sulfur.

11. A process for producing vanadium chloride which comprises chlorinating vanadium dioxide with a chlorinating agent selected from the group consisting of chlorine, sulfur chloride and ferric chloride in the presence of liquid sulfur in an amount of from about 2.5 to about 10 times the weight of vanadium dioxide and at a temperature between the melting point and boiling point of sulfur.

12. A process for producing zirconium chloride which comprises chlorinating zirconium dioxide with a chlorinating agent selected from the group consisting of chlorine, sulfur chloride and ferric chloride in the presence of liquid sulfur in an amount of from about 2.5 to about 10 times the weight of zirconium dioxide and at a temperature between the melting point and boiling point of sulfur.

13. A process for producing tungsten chloride which comprises chlorinating tungsten oxide with a chlorinating agent selected from the group consisting of chlorine, sulfur chloride and ferric chloride in the presence of liquid sulfur in an amount of from about 2.5 to about 10 times the weight of tungsten oxide and at a temperature between the melting point and boiling point of sulfur.

References Cited in the file of this patent

UNITED STATES PATENTS

| | | |
|---|---|---|
| 1,852,183 | Miller et al. | Apr. 5, 1932 |
| 1,994,367 | Millar | Mar. 12, 1935 |
| 2,701,179 | McKinney | Feb. 1, 1955 |
| 2,895,796 | Hill | July 21, 1959 |
| 2,895,797 | Hill | July 21, 1959 |

FOREIGN PATENTS

| | | |
|---|---|---|
| 521,975 | Great Britain | June 5, 1940 |